Jan. 12, 1932.     C. BORNMANN     1,840,307
PRINTING FRAME
Filed March 22, 1928
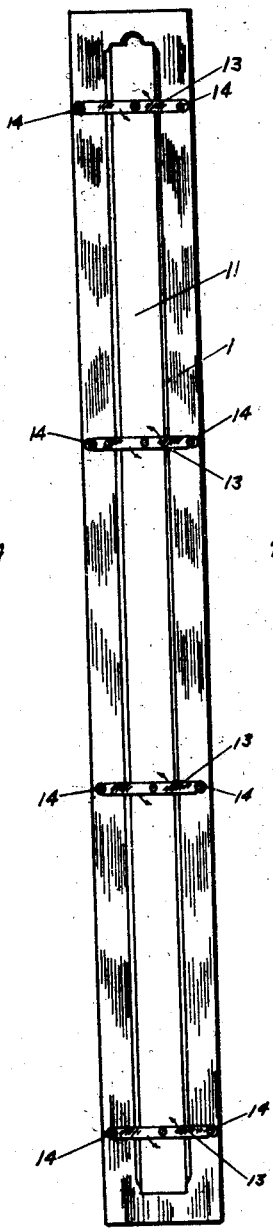
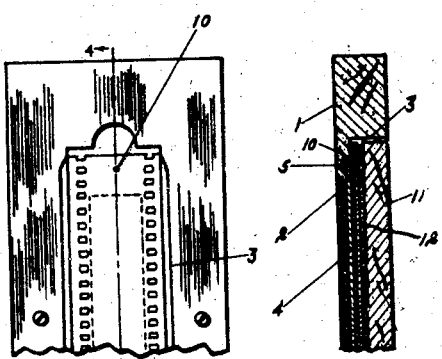
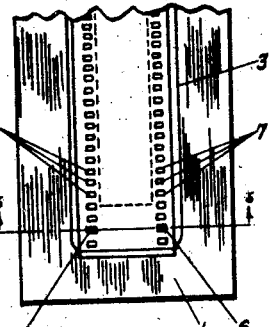
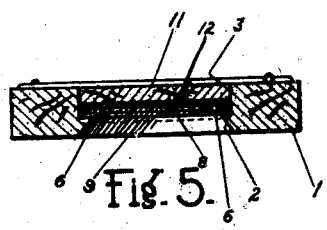
INVENTOR.
CARL BORNMANN.
BY
ATTORNEY Patented Jan. 12, 1932

1,840,307

UNITED STATES PATENT OFFICE

CARL BORNMANN, OF BINGHAMTON, NEW YORK, ASSIGNOR TO AGFA ANSCO CORPORATION OF BINGHAMTON, NEW YORK

PRINTING FRAME

Application filed March 22, 1928. Serial No. 263,922.

The primary object of my invention is to provide a printing frame adapted for use with elongated strips of film or paper, such as motion picture film, such strips being now commonly used in lengths of two or three feet in cameras for taking a series of perhaps fifty or more "still" pictures. From the strip of negatives thus made, it is often desirable to print a similar strip of positives on film for the purpose of projection, or to print a strip of positives on photographic paper.

An important feature of my invention lies in the provision of an elongated printing frame adapted to receive such strips and provided with means for removably fastening the same within the frame for printing purposes.

Other objects and advantages in details of construction and operation will be apparent as the description proceeds, reference now being had to the figures of the drawings wherein like reference numerals indicate like parts.

In the drawings:—

Figure 1 is a front plan view of my improved printing frame.

Figure 2 is a rear plan view thereof.

Figure 3 is a detail rear view with the clamping strip removed, illustrating the method of removably securing the film strips in the frame.

Figure 4 is a detail cross sectional view taken on the line 4—4 of Figure 3.

Figure 5 is a detail cross sectional view taken on the line 5—5 of Figure 3.

The reference numeral 1 indicates the body of my improved printing frame, and consisting of an elongated strip of suitable material provided centrally substantially throughout its length with an opening 2 through which the exposure may be made. The back of the frame is recessed as at 3 to receive first a glass plate or window 4 adapted to close the opening 2. The frame is preferably rabbeted as at 5 to receive the edges of this transparency 4.

Fixed within the recessed portion 3 of the frame adjacent one end thereof, are two upstanding pins 6, adapted to receive the perforations 7 of the negative film strip 8 containing the images and the positive film or paper strip 9 upon which the images are adapted to be printed. With one end of these negative and positive strips attached in this manner to the pins 6, the strips are pulled out straight within the recess 3 of the frame, and secured in position flat upon the glass 4 by attaching their opposite ends to an upstanding pin 10 projecting upwardly from the opposite end of the recess 3 and adapted to pierce the strips 8 and 9 when the same are forced downwardly thereover.

A removable back 11 is provided for the frame and has on its underside a soft padding 12 of suitable material adapted to engage against the positive strip 9 and to hold this positive strip together with the negative strip 8 into positive contact and engagement against the glass 4. Spring securing devices 13 of common design cooperating with pins 14 on the sides of the rear of the frame 1 are provided to removably secure the back 11 in such position.

By means of the pins 6 and the pin 10, the strips of film may be properly aligned within the printing frame and are maintained in such alignment by such pins and by the back member 11 which also holds the film strips tightly together for proper contact printing and exposure.

In the use of my invention, the operator first removes the back 11, hooks one end of a strip of negative film over the pins 6 and fastens the opposite end over the pin 10. The strip of positive film or paper is then similarly secured directly over the negative and the back member 11 placed in position where it is held tightly in engagement with the film strips by means of the spring fastening means 13. The window 2 of the printing frame can then be exposed to the printing light and the positive strip then removed for development in the usual manner.

One particular advantage of printing elongated strips of film in this manner, lies in the fact that if different sections of the film vary in density, the operator may readily control the printing light reaching such various sections by covering or "dodging" during the printing operation.

It will be understood that changes may be made in details of construction and arrangement of parts without departing from the spirit and scope of my invention. I do not limit myself therefore to the exact structure herein shown and described other than by the appended claims.

I claim:—

1. A printing frame comprising an elongated frame member having an unobstructed window therein substantially throughout its length, the rear side of said frame being recessed, a transparent covering for said window, pins in said recess for securing strips of film therein, and a back removably secured to said frame and engageable with said strips.

2. A printing frame comprising an elongated frame member having an elongated unobstructed exposure window, the rear side of said frame being recessed, pins adjacent one end of said recess for securing one end of film strips therein, and a pin adjacent the opposite end of said recess for piercing and holding said strips in alignment with said window, and a removable back for said frame engageable with said strips.

CARL BORNMANN.